US 7,310,891 B2

(12) United States Patent
Dall'Aglio

(10) Patent No.: US 7,310,891 B2
(45) Date of Patent: Dec. 25, 2007

(54) HEAD FOR THE LINEAR DIMENSION CHECKING OF MECHANICAL PIECES

(75) Inventor: Carlo Dall'Aglio, Castello D'Argile (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 10/577,492

(22) PCT Filed: Nov. 16, 2004

(86) PCT No.: PCT/EP2004/052972

§ 371 (c)(1),
(2), (4) Date: Apr. 27, 2006

(87) PCT Pub. No.: WO2005/054776

PCT Pub. Date: Jun. 16, 2005

(65) Prior Publication Data

US 2007/0033820 A1    Feb. 15, 2007

(30) Foreign Application Priority Data

Nov. 20, 2003  (IT) .......................... BO2003A0694

(51) Int. Cl.
*G01B 5/00* (2006.01)
*G01B 7/00* (2006.01)

(52) U.S. Cl. .......................... 33/561; 33/555.1; 33/559

(58) Field of Classification Search ................ 33/561, 33/556, 557, 558, 559, 560, 551, 552, 553, 33/554, 555, 555.1, 555.2, 555.3
See application file for complete search history.

(56) References Cited

U.S. PATENT DOCUMENTS 3,123,943 A * 3/1964 Horsch et al. ................ 451/8

(Continued)

FOREIGN PATENT DOCUMENTS

IT            1 179 306        9/1987

(Continued)

*Primary Examiner*—G. Bradley Bennett
*Assistant Examiner*—Amy R. Cohen
(74) *Attorney, Agent, or Firm*—Dickstein Shapiro LLP

(57) ABSTRACT

A gauging head includes a substantially closed casing, a movable arm with a first portion, partly located inside the casing and associated with a position transducer, and a second portion, outside the casing, carrying a feeler for contacting a piece to be checked, and a zero-setting mechanism for adapting the head to check pieces with different nominal dimensions. The zero-setting mechanism, located outside the casing, includes a quick locking/unlocking device between the first and second portions of the arm and a movable mechanical reference coupled with the first portion of the arm and including a reference surface cooperating with a corresponding reference surface for holding the first portion of the arm in a preset position with respect to the casing. The quick locking/unlocking device and the movable mechanical reference are operated together for unlocking the coupling between the portions of the arm and concurrently hold the preset position, and for locking together the two portions and concurrently release the arm.

14 Claims, 4 Drawing Sheets

U.S. PATENT DOCUMENTS

| | | | |
|---|---|---|---|
| 3,678,584 A * | 7/1972 | Dolan | 33/559 |
| 4,377,911 A * | 3/1983 | Iida et al. | 33/561 |
| 4,389,786 A * | 6/1983 | Sakata et al. | 33/561 |
| 4,503,616 A * | 3/1985 | Pullen | 33/558 |
| 4,524,523 A * | 6/1985 | Golinelli et al. | 33/501.5 |
| 5,099,585 A * | 3/1992 | Liskow | 33/783 |
| 6,920,698 B2 * | 7/2005 | Dall'Aglio et al. | 33/551 |
| 7,137,210 B2 * | 11/2006 | Kanai et al. | 33/555.1 |
| 7,228,640 B2 * | 6/2007 | Trionfetti | 33/552 |
| 2003/0159302 A1 | 8/2003 | Dall'Aglio et al. | |
| 2006/0042109 A1 | 3/2006 | Kanai et al. | |

FOREIGN PATENT DOCUMENTS

| | | |
|---|---|---|
| JP | 62-119402 A | 5/1987 |
| JP | 2002-181502 A | 6/2002 |
| JP | 2004-109110 A | 4/2004 |
| WO | WO 2004/011874 A1 | 2/2004 |

* cited by examiner

HEAD FOR THE LINEAR DIMENSION CHECKING OF MECHANICAL PIECES

TECHNICAL FIELD

The present invention relates to a head for the linear dimension checking of mechanical pieces, including a casing, a movable arm with a first portion partly located inside the casing and a second portion entirely located at the exterior of the casing, a position transducer inside the casing and associated with the first portion, a feeler coupled with the second portion for contacting the piece to be checked, a zero-setting mechanism for adapting the head, by adjusting the mutual arrangement between the first portion and the second portion of the movable arm, to check pieces with different nominal dimensions, the zero-setting mechanism including a movable mechanical reference between the movable arm and the casing, arranged substantially at the exterior of the casing, the movable mechanical reference being adapted to take two positions, to hold the first portion of the movable arm in a preset position with respect to the casing and to release the first portion, respectively.

BACKGROUND ART

Gauging heads are known—more specifically gauging heads for checking dimensions of pieces being machined in grinding machines—which include one or two movable arms, each comprising two mutually adjustable portions, a first portion coupled with a transducer of the head and a second portion carrying a feeler for contacting the pieces to be checked.

Italian patent No. 1179306 describes some forms of gauging heads of this type, in which the two portions of the movable arm are mutually coupled by means of frictional coupling, while zero-setting devices with movable mechanical references, located at the exterior of the casing of their associated heads, enable to accomplish, in an extremely simple way, operations for mechanically zero-setting the heads. More specifically, the mechanical references can be arranged in a zero-setting position that determines and sets, or contributes to set, the arrangement of one of the two portions of the movable arm, the one that is directly coupled with the transducer. This arrangement corresponds to a zero configuration of the transducer and is locked when it is required to change from the checking of pieces with a determined nominal dimension, for example a determined diameter, to the checking of pieces with a different nominal dimension (diameter). In order to "zero-set" the head, a master piece with the fresh nominal dimension is positioned in the measuring position (for example between the live center and the dead center of an external grinding machine) and a force is manually applied to the portion of the arm carrying the feeler. This force is sufficiently strong to alter the arrangement with respect to the other portion and to displace the feeler to contact the master piece. By virtue of the presence of the mechanical references the transducer signal remains, in the course of this operation, roughly at a zero measurement value.

Once the feeler is displaced to contact the piece and the force manually applied to the arm is removed, the mechanical zero-setting operation ends. The mechanical references are moved for unlocking the portion of the arm coupled with the transducer and for enabling measurement displacements of the entire arm, while the arrangement of the two portions that form it remains unaltered thanks to the frictional coupling.

The zero-setting is more accurately defined by carrying out a simple electric zero-setting operation that consists in operating a potentiometer located in an amplifier which detects and displays the signal of the transducer/s associated with the movable arm/s.

Thus, in the heads according to Italian patent No. 1179306 it is possible to carry out, in an extremely simple and rapid way, mechanical zero-setting operations thanks to the locking of the zero position. In this way lengthy and repeated operations, that experienced and skilled operators have to perform in order to reach the condition whereby the feeler/s contacts/contact the master piece and, concurrently, a measurement signal is approximately at zero value, can be avoided. By virtue of the fact that both the frictional coupling and the movable mechanical references are at the exterior of the head casing, it is furthermore possible to apply the zero-setting mechanism to conventional heads without any need of considerable constructional changes and/or constructional changes which may affect the component parts of the head arranged within the casing.

In the course of the operations for checking mechanical pieces machined in a machine tool or in the approach towards/displace away phases between head and piece, the arms may undergo impacts. Even though such impacts may be small and insufficient to damage the arms or other component parts of the head, they may alter the arrangement, set by the frictional coupling, between the portions of the arm and consequently alter the zero position. In addition to the serious problems caused by the need to interrupt the machining in order to repeat the zero-setting operations, there may occur situations in which the altering of the zero position is not noticed and the checking operations are not stopped and consequent errors could arise in the course of the machining of the pieces.

Furthermore in the heads according to previously mentioned Italian patent, the correct zero position could be altered in an unpredictable way by arm flexures caused by the not negligible force that it is required to apply, in the course of the zero-setting operations, to alter the frictional coupling between the portions of each arm.

DISCLOSURE OF THE INVENTION

An object of the present invention is to provide a head including a device for accomplishing, in a simple and quick way, particularly accurate, safe and extremely stable zero-setting operations, improving the overall reliability of the head.

A further object of the invention is to provide a head with a reliable, particularly compact and easy to use zero-setting mechanism, applicable, without substantial modifications, even to heads already present on the market. These and other objects and advantages are achieved by a head according to claim 1.

BRIEF DESCRIPTION OF THE DRAWINGS

The invention is now described with reference to the enclosed sheets of drawings which show a preferred embodiment of the invention and are given by way of non limiting example only, wherein.

BEST MODE FOR CARRYING OUT THE INVENTION

The gauging head shown in FIGS. 1 to 5 includes a casing 1—substantially of a prismatic shape such as a parallelepiped on shape—with a lower closure plate 2 and a front closure plate 3. The closure plate 3 supports, by means of a block 4, a resiliently deformable element that achieves a fulcrum 5 and defines a geometric axis of rotation perpendicular to the plane of FIGS. 1 and 2.

Figure 4:
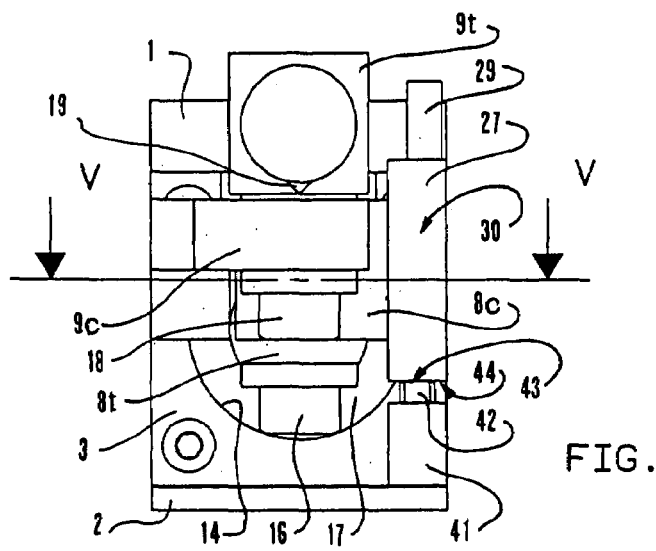
FIG. 4 is an enlarged front view of the head shown in FIG. 1, when viewed along the direction indicated by the arrow IV of FIG. 1.
Figure 5:
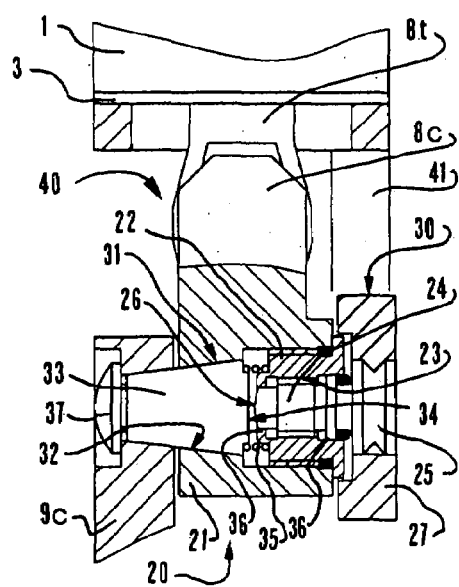
FIG. 5 is a partly cut-away cross-sectional view of the head of FIG. 1, along line V-V of FIG. 4, that shows constructional details—some not cross-sectioned—of the zero-setting mechanism.

A movable measuring arm 7 fixed to fulcrum 5 includes a first portion 8, partly located at the interior of casing 1, and a second portion 9, entirely located at the exterior of the casing 1 and adjustable with respect to the first portion 8. The first portion 8 consists of two parts, an end part 8t of the arm 7, almost entirely housed in the casing 1 and protruding from an opening 14 in the front plate 3, and a central part 8c of the arm 7, rigidly coupled to the end of the end part 8t protruding from the casing 1 at the plate 3. The rigid coupling between end part 8t and central part 8c is achieved, for example, by means of a screw 16. A resilient gasket 17, partly shown in FIG. 4, is coupled with movable arm 7 and with casing 1 at plate 3, provides sealing and concurrently allows the measurement displacements of the movable arm 7.

Figure 1:
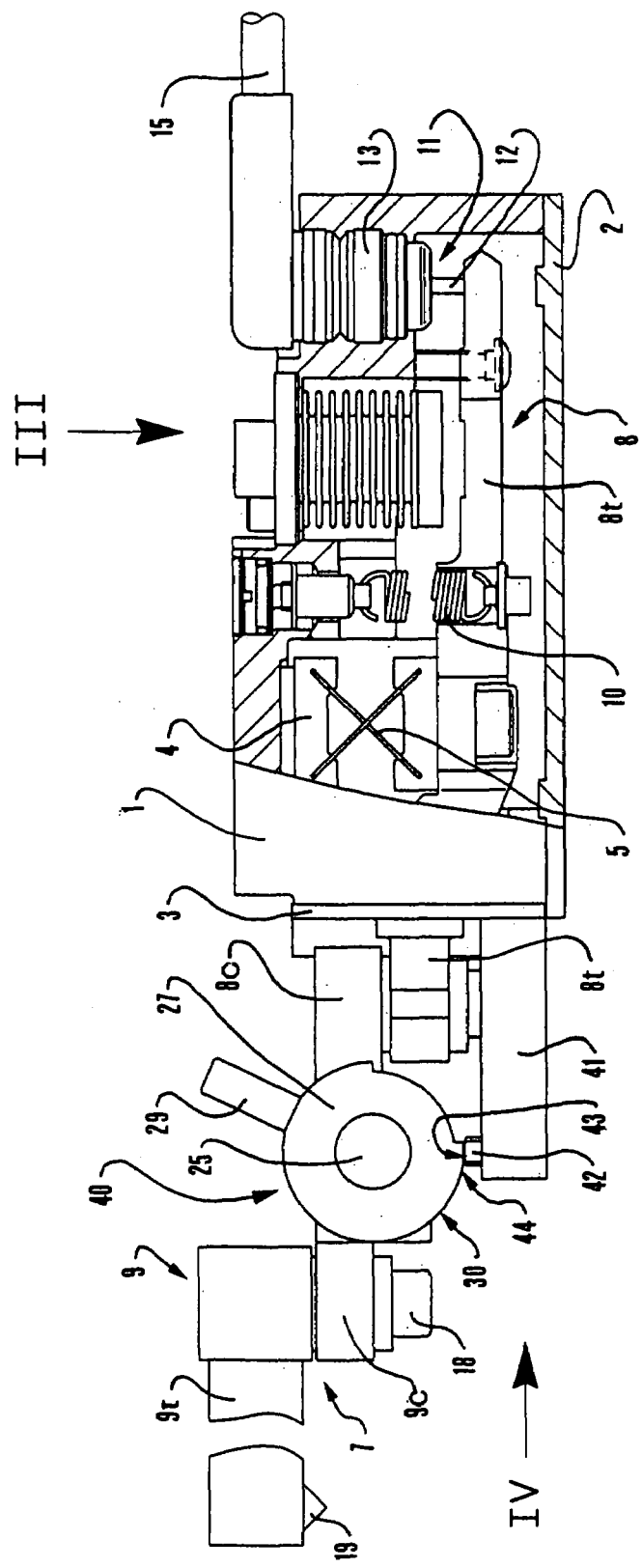
FIGS. 1 and 2 are partly cross-sectioned side views of a gauging head, provided with a quick zero-setting mechanism according to the invention, shown in different working conditions.
Figure 2:
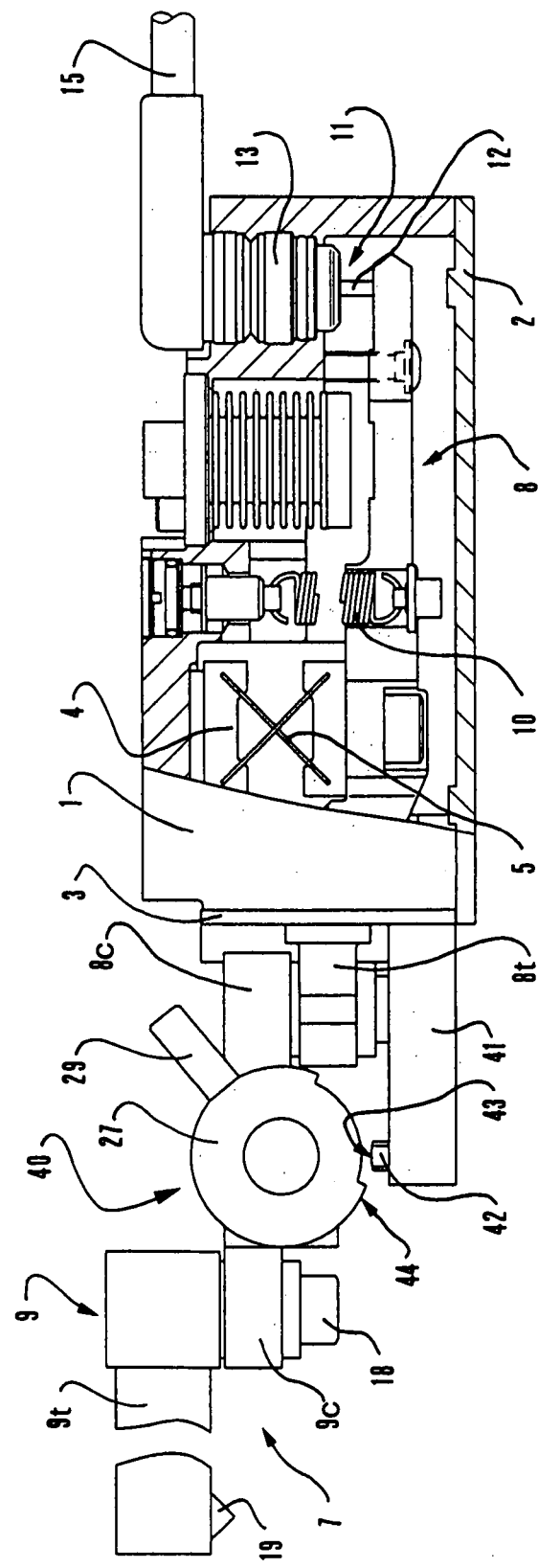
Figure 3:
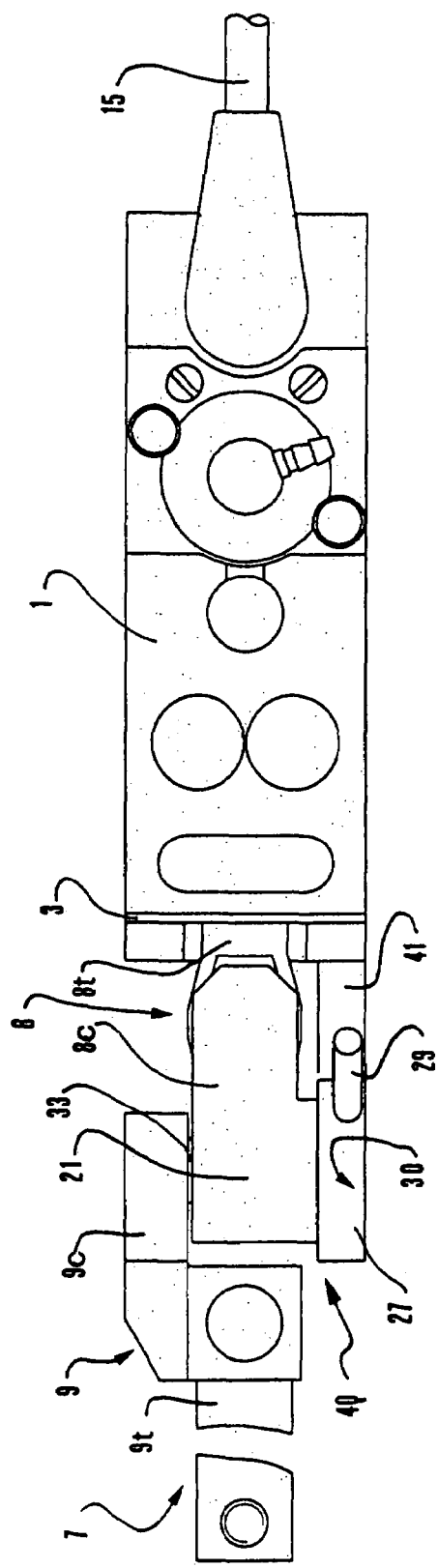
FIG. 3 is a top view of the head shown in FIG. 1, when viewed along the direction indicated by the arrow III of FIG. 1.

A spring 10, for example a return spring, is arranged between the casing 1 and the first portion 8—more specifically the end part 8t of the latter. With reference to FIGS. 1 and 2, the spring 10 urges the arm 7 to rotate in a counter-clockwise direction. The movable arm 7 is associated with a differential transformer position transducer 11 of a known type with a magnetic core, not shown in the drawings, supported by means of a stem 12 coupled with the portion 8, and a support 13 that includes windings of the differential transformer. Electric wires in a cable 15 come out of the support 13, fixed to casing 1, and connect the head to a power supply, amplification and display unit, not shown in the drawings.

The second portion 9, located at the exterior of the casing 1, consists of two parts, i.e. a central part 9c of the arm 7, coupled to portion 8 in an adjustable way as hereinafter described in more detail, and an end part 9t of the arm 7, rigidly coupled with the central part 9c by means of a screw 18. At the free end of the end part 9t the second portion 9 of the arm 7 carries a feeler 19 which contacts, urged by the action of the spring 10, the surface of the piece to be checked (not shown in the drawings).

A zero-setting mechanism 40 includes a quick locking/unlocking device 20 for locking and for unlocking the first portion 8 and the second portion 9 of the movable arm 7 together in a determined mutual arrangement, as hereinafter described in more detail. The quick locking/unlocking device 20, shown in detail in FIGS. 5 and 6 that correspond to the arrangements shown in FIGS. 1 and 2 respectively, includes:

an end hollow element 21 of the central part 8c in the first portion 8 defining a locking axis substantially parallel to the geometric axis of rotation of arm 7, a guide component 22, coupled in a substantially rigid way at the interior of the hollow element 21, with a threaded hole 23, aligned along said locking axis, and precision guide surfaces 36;

thrust elements with a thrust pin 24—coupled with the threaded hole 23 and, at unthreaded portions, with the guide surfaces 36—movable along the locking axis direction, that includes a head 25 located at an end at the exterior of the hollow element 21 and defines a thrust surface 26 at the free end within the hollow element 21;

a substantially disk-shaped transmission element 27 coaxially coupled with the head 25 of the thrust pin 24 and locked thereto by means of a threaded radial dowel 28;

a coupling element 33 that defines an external frusto-conical shaped clamping surface 31 and on one side is rigidly fixed, by means of a screw 37, to the central part 9c in the second portion 9, and on the other side is partly housed in the hollow element 21 at a through opening of the latter that defines an internal frusto-conical shaped clamping surface 32. A plane rest surface 34 is defined at an end area of the coupling element 33 housed at the interior of the hollow element 21 and cooperates with the thrust surface 26 of the pin 24; and a resilient compression element, more specifically a spring 35, arranged between the guide component 22 and the coupling element 33, for applying a substantially constant thrust between the external clamping surface 31 and the internal clamping surface 32.

The transmission element 27 has considerable thickness, defines a substantially cylindrical lateral surface 30, and features different radial dimensions at different angular sectors. More specifically, in the example shown in the figures, transmission element 27 and corresponding lateral surface 30 have smaller radial dimensions at an angular sector of approximately 90° with respect to the remaining 270°.

A drive lever 29 is radially coupled with the transmission element 27, for example by means of a threaded coupling not shown in the figures, for driving the latter to perform rotation displacements about the locking axis.

The zero-setting mechanism 40 also includes a protruding element 41, rigidly fixed to the plate 3 of casing 1, and a reference dowel 42, coupled in an adjustable way with the protruding element 41, the dowel 42 defining a first abutment and reference surface 43. The lateral surface 30 of the transmission element 27 defines, at the 270° sector with larger radial dimensions, a second abutment and reference surface 44 integral with the movable arm 7—in particular with the central part 8c in the first portion 8—for cooperating with the first abutment and reference surface 43 in the hereinafter described zero-setting phases.

The transmission element 27 of the quick locking/unlocking device 20 performs a movable mechanical reference of the zero-setting mechanism 40. Rotation displacements of the transmission element 27 about the locking axis are effected by manually operating the drive lever 29 and also serve to define and to set, in the zero-setting phase, a mechanical zero position of the first portion 8 of the movable arm 7, at which the signal provided by the transducer 11 remains, at least approximately, at a zero measurement value.

The operation of the head shown in the figures, more specifically the operation of the zero-setting mechanism, is hereinafter described.

Figure 6:
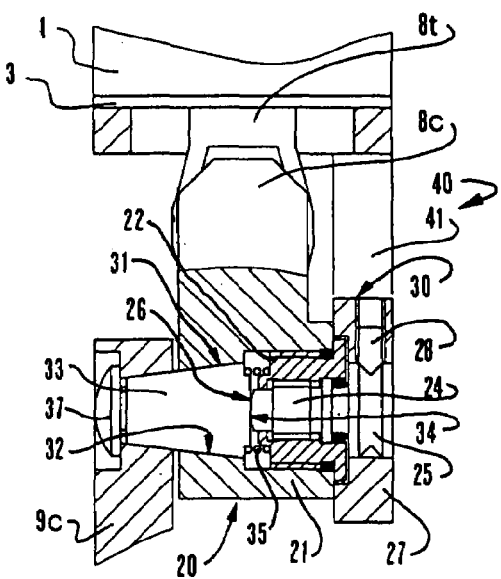
FIG. 6 is a partly cut-away cross-sectional view, alike the view of FIG. 5, of the zero-setting mechanism shown in a different working phase, corresponding to the one of FIG. 2.

When the transmission element 27 is in the position shown in FIGS. 2 and 6, i.e. the area of the lateral surface 30 in correspondence of the reduced radial dimensions faces the reference dowel 42, the head is in measuring conditions for performing the checking of pieces with a determined nominal dimension. In fact, in this position the arrangement of the pin 24 in the threaded hole 23 is such that surface 26 applies to rest surface 34 a constant thrust that is sufficient for locking the frusto-conical surfaces 31 and 32 one against the other and thus locking in a steadfast way the mutual position between the first portion 8 and the second portion 9 of the movable arm 7. Besides, in the formerly mentioned position taken by the transmission element 27, the first abutment and reference surface 43 integral with the casing 1 is separate from the lateral surface 30 (as previously stated, the 90° sector with smaller radial dimensions faces the reference dowel 42), and does not interfere with measurement displacements of the movable arm 7.

When it is required to change to the checking of pieces with a different nominal dimension, for example a larger nominal dimension, the following operations are performed. The operator, by manually operating lever 29, causes a rotation of the transmission element 27 in a counterclockwise direction until the reference dowel 42 contacts the lateral surface 30 at the sector with larger radial dimensions. This condition is shown in the FIGS. 1, 3, 4 and 5.

Contact between the first abutment and reference surface 43 of the dowel 42 and the second abutment and reference surface 44, i.e. the 270° sector of the lateral surface 30 of the transmission element 27, is held by the action of the spring 10. In this condition, or "zero" condition, the portion 8 is held in a preset position with respect to the casing 1 defined so that the signal sent by the transducer 11 approximately corresponds to a zero value of the indication provided by the unit connected to the head. If desired, this reference condition can be modified—only if it becomes necessary in a possible head setting up phase—by rotating the dowel 42 in order to adjust the position of the surface 43 with respect to the element 41.

The counterclockwise rotation of the transmission element 27 causes a corresponding rotation of the thrust pin 24, displacing away from the coupling element 33, until arriving at an unlocking condition of device 20 (FIG. 5) which occurs, thanks to a suitable preventive setting up, when there is reached the configuration illustrated in FIG. 1. Under the unlocking condition, spring 35 applies a force between the clamping surfaces 31 and 32 that is sufficient for holding them resting one against the other in a mutual angular position that can be modified by means of a slight thrust between the portions 8 and 9 of the arm 7.

In this configuration the operator operates on the end part 9t in the second portion 9 of the arm 7 in order to drive the feeler 19 into contact with the master piece. This obviously occurs by a mutual rotation of the second portion 9 with respect to the first portion 8. Lastly, the operator displaces the lever 29 again to the position shown in FIG. 2, thereby releasing the portion 8 of the movable arm 7 with respect to the casing 1 (further to the separation of the first abutment and reference surface 43 and the second abutment and reference surface 44 from each other) and locking together the first portion 8 and the second portion 9. The surfaces 36 contribute to accurately guide the displacements of the pin 24 along the locking axis and keep the pin 24 aligned along said axis in the locking position (FIG. 6), avoiding misalignments due to the clearance in the threaded coupling with the hole 23 and thus improving the repeatability of the zero-setting mechanism 40. So the mechanical zero-setting operation ends and it is possible to complete the zero-setting by carrying out an electric zero-setting by operating a specific potentiometer in the unit connected to the head.

The setting up of the previously mentioned head is carried out beforehand and, in practice, once for all and foresees to simply operate on the radial dowel 28 for coupling the transmission element 27 with the head 25 of the pin 24 in an angular position that allows, as previously described, the occurring of these events:

in the configuration shown in FIG. 1 (unlocking position of the device 20), the unlocking of the second portion 9 of the arm 7 with respect to the first portion 8, when the latter is fixed with respect to the casing 1 in the zero condition, and in the configuration shown in FIG. 2 (locking position of the device 20), the locking of the first portion 8 with the second portion 9 when the arm 7 is free to perform measurement displacements with respect to the casing 1.

Thus, the heads according to the present invention preserve the positive features of the heads described in Italian patent No. 1179306, for example insofar as the arrangement of the zero-setting mechanism at the exterior of the casing is concerned, which is a feature that makes the application feasible, by effecting simple and rapid modifications, to existing heads as well as to heads in which it is difficult to internally insert a similar mechanism.

Among the additional advantages that the present invention provides, there is on the one hand the possibility of locking in a steadfast and safe way the configuration of the movable arm 7, i.e. the mutual position between the portions 8 and 9 that form it, and on the other hand the possibility of altering said configuration for zero-setting without there being the need to apply an excessive force to the arm 7 and thereby prevent flexures of the latter.

Moreover, the illustrated and herein so far described embodiment provides the further advantage of permitting, simply by one displacement of the lever 29, to shift from a zero-setting condition to a working condition, and vice versa, wherein in the zero-setting condition (FIGS. 1 and 5) the mechanical zero position of transducer 11 is set, and is possible, by keeping said condition unchanged, to drive feeler 19 onto a master piece by modifying the configuration of movable arm 7, and in the working condition (FIGS. 2 and 6), when arm 7 can perform measurement displacements, the configuration of movable arm 7, i.e. the mutual position between portions 8 and 9 that form it, is locked and substantially irremovable.

Furthermore, the advantages already present in the previously mentioned Italian patent No. 1179306, that consist in simple and quick zero-setting operations performed without using specific tools, are enhanced in the above described and illustrated head, in which it is not even required to manually displace arm 7 before operating zero-setting mechanism 40 for defining the predetermined mechanical zero position.

Although the illustrated and herein so far described embodiment refers to a head with a single movable arm 7, it is obvious that the zero-setting mechanism 40 can be provided for each movable arm of a known head with a single casing and two arms movable with respect to it and coupled with associated transducers for the internal and external diameter dimension checking. A similar head with two movable arms (herein not shown) has two protruding elements integral with the casing that are entirely similar to the element 41, with associated reference dowels 42 for cooperating with the external surfaces 30 of movable mechanical references 27 coupled with the two arms 7. The constructional features and the operation of each of the two zero-setting mechanisms are alike those of the mechanism 40 shown in the figures.

The invention has been described with reference to gauging heads, i.e. heads that measure the deviations of piece dimensions with respect to nominal or reference dimensions. However, the invention can also be advantageously utilized in absolute measuring heads, i.e. heads that directly measure piece dimensions. In similar heads, the described zero-setting devices enable measuring range changes to be made in a simple and quick way.

The implementing of each of the portions 8 and 9 forming the movable arm 7 in two parts 8t, 8c and 9c, 9t, respectively, is not mandatory in a head according to the present invention and the first portion 8 and/or the second portion 9 can be implemented as a single piece. The implementing in two parts, as shown in the figures, is advantageous in later applications to pre-existing heads in which it is particularly simple to modify the head by replacing the closure plate with a plate 3 that includes the protruding element 41 and by inserting, between a first portion identifiable by the end part 8t coupled with the fulcrum 5 and with the transducer 11 and a second portion identifiable by the end part 9t carrying the feeler 19, fresh additional parts 8c and 9c coupled with each other by the zero-setting mechanism 40.

Another possible constructional detail, differing from what has been illustrated and described, foresees to substitute the precision guide surfaces 36 with (or to add to it) a known system for improving the threaded coupling between the pin 24 and the hole 23. More specifically, it is possible to foresee a threaded insert, or threaded self-locking insert, including polygonal friction coils, between the thrust pin 24 and the threaded hole 23. This enables to adjust the position of the pin 24 with respect to the guide component 22 in an extremely steadfast manner, and consequently to increase the locking reliability between the first portion 8 and the second portion 9 of the arm 7.

The heads according to the present invention can feature many other alternative constructions regarding, for example, the quick locking/unlocking device 20 and/or the movable mechanical reference of the zero-setting mechanism 40, that can be implemented in different ways, per se known and also physically separate from each other. Even the first reference surface 43 can be achieved or arranged in a different way with respect to the surface of the dowel 42 shown in the figures and coupled with a different component part, also integral to the casing 1.

The invention claimed is:

1. A head for the linear dimension checking of mechanical pieces, comprising:
    a casing,
    a movable arm with a first portion partly located inside the casing and a second portion entirely located at the exterior of the casing,
    a position transducer inside the casing and associated with said first portion,
    a feeler coupled with said second portion for contacting the piece to be checked,
    a zero-setting mechanism for adapting the head, by adjusting the relative arrangement between the first portion and the second portion of the movable arm, to check pieces with different nominal dimensions, the zero-setting mechanism including a movable mechanical reference between the movable arm and the casing, arranged at the exterior of the casing, the movable mechanical reference being adapted to have at least two positions, to hold said first portion of the movable arm in a preset position with respect to the casing and to release the first portion, respectively,
    wherein the zero-setting mechanism includes a quick locking/unlocking device between said first portion and said second portion of the movable arm.

2. The head according to claim 1, wherein the zero-setting mechanism includes a first abutment and reference surface, integral with the casing, said movable mechanical reference including a second abutment and reference surface, integral with the movable arm, said first abutment and reference surface and said second abutment and reference surface being adapted to mutually cooperate for defining said preset position.

3. The head according to claim 2, wherein the quick locking/unlocking device defines said second abutment and reference surface.

4. The head according to claim 3, wherein said quick locking/unlocking device is adapted to take an unlocking position, at which said first abutment and reference surface and said second abutment and reference surface are in contact with each other for defining said preset position, and a locking position at which said first abutment and reference surface and said second abutment and reference surface are separate from each other.

5. The head according to claim 4, wherein the quick locking/unlocking device includes locking surfaces integral with said first portion and said second portion of the movable arm, and thrust elements adapted to urge said locking surfaces one against the other for locking said first portion and said second portion of the movable arm with respect to each other in said locking position of the quick locking/unlocking device.

6. The head according to claim 5, wherein the quick locking/unlocking device includes a resilient compression element adapted to keep said locking surfaces resting on each other in said unlocking position of the quick locking/unlocking device.

7. The head according to claim 6, wherein said thrust elements include a thrust pin adapted to urge said locking surfaces one against the other along a locking axis.

8. The head according to claim 5, wherein the quick locking/unlocking device includes a transmission element, coupled with said thrust elements and manually-operated, the transmission element and the thrust elements being coupled with said first portion of the movable arm.

9. The head according to claim 8, wherein said thrust elements include a thrust pin adapted to urge said locking surfaces one against the other along a locking axis and wherein said transmission element is substantially disk-shaped, is coupled with the thrust pin and is adapted to perform rotation displacements about the locking axis, the transmission element defining said movable mechanical reference and including a curved lateral surface that defines said second abutment and reference surface.

10. The head according to claim 9, wherein said second abutment and reference surface is defined by an area with larger radial dimensions of said curved lateral surface.

11. The head according to claim 9, including a drive lever radially coupled with the transmission element for enabling an operator to manually drive the transmission element to perform said rotation displacements about the locking axis for changing from said locking position to said unlocking position of the quick locking/unlocking device, and vice versa.

12. The head according to claim 2, wherein the casing includes a closure plate with an opening adapted to allow the passage and measurement displacements of the movable arm, and a protruding element, integral with the closure plate, that carries said first abutment and reference surface.

13. The head according to claim 12, wherein a reference dowel is coupled in an adjustable way to said protruding element and defines said first abutment and reference surface.

14. The head according to claim 1, wherein each of said first portion and said second portion of the movable arm includes an end part and a central part of the movable arm, rigidly coupled with each other, the quick locking/unlocking device being arranged between said central parts, the movable mechanical reference being coupled with the central part in the first portion of the movable arm.

* * * * *